(12) United States Patent
Yang

(10) Patent No.: US 7,474,804 B2
(45) Date of Patent: Jan. 6, 2009

(54) METHOD FOR AUTOMATICALLY CORRECTING SKEW IMAGE

(75) Inventor: Keven Yang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 1016 days.

(21) Appl. No.: 10/689,033

(22) Filed: Oct. 21, 2003

(65) Prior Publication Data

US 2004/0252912 A1    Dec. 16, 2004

(30) Foreign Application Priority Data

Jun. 13, 2003    (TW) .............................. 92116108 A

(51) Int. Cl.
G06K 9/32 (2006.01)
G06K 9/62 (2006.01)
H04N 1/407 (2006.01)
H04N 1/46 (2006.01)
H04N 1/40 (2006.01)
G01B 11/26 (2006.01)

(52) U.S. Cl. ...................... 382/296; 382/190; 382/224; 358/3.26; 358/537; 358/465; 358/501; 356/138; 702/150

(58) Field of Classification Search ......... 356/138–155; 382/151, 205, 221, 286–290, 296, 190–200, 382/224–225; 702/150–172; 358/3.2, 3.26–3.27, 358/537, 448, 452–466, 501
See application file for complete search history.

(56) References Cited

U.S. PATENT DOCUMENTS

| | | | | |
|---|---|---|---|---|
| 4,780,711 A * | 10/1988 | Doumas | ...................... | 345/614 |
| 4,926,490 A * | 5/1990 | Mano | .......................... | 382/177 |
| 4,941,189 A * | 7/1990 | Britt | ............................ | 382/290 |
| 5,093,653 A * | 3/1992 | Ikehira | ........................ | 345/657 |
| 5,181,260 A * | 1/1993 | Kurosu et al. | ................ | 382/289 |
| 5,187,753 A * | 2/1993 | Bloomberg et al. | ......... | 382/289 |
| 5,233,168 A * | 8/1993 | Kulik | .......................... | 235/456 |
| 5,355,420 A * | 10/1994 | Bloomberg et al. | ......... | 382/155 |
| 5,452,374 A * | 9/1995 | Cullen et al. | ................. | 382/293 |
| 5,502,793 A * | 3/1996 | Ng | .............................. | 358/1.9 |
| 5,528,387 A * | 6/1996 | Kelly et al. | .................. | 358/488 |
| 5,604,820 A * | 2/1997 | Ono | ............................ | 382/190 |
| 5,818,976 A * | 10/1998 | Pasco et al. | .................. | 382/289 |
| 5,859,929 A * | 1/1999 | Zhou et al. | ................... | 382/175 |
| 5,901,253 A * | 5/1999 | Tretter | ......................... | 382/289 |

(Continued)

OTHER PUBLICATIONS

Rajiv Kapoor, Deepak Bagai and T. S. Kamal, "Skew angle detection of a cursive handwritten Devanagari script character image", 2002, J. Indian Inst. Sci., May-Aug. 2002, vol. 82, pp. 161-175.*

Primary Examiner—Matthew C Bella
Assistant Examiner—Manav Seth
(74) Attorney, Agent, or Firm—Rabin & Berdo, P.C.

(57) ABSTRACT

A method for correcting skew images. The method first groups a scanned image into blocks with N*N pixels, and detects all the blocks to find out the edge areas with the larger luminance or chrominance difference afterward. Next, gradient angles of the edge areas are calculated, and a predominant angle is determined from among the calculated gradient angles; and (c) rotating the image according to the predominant gradient angle. The predominant gradient angle is taken as the skew angle for the image to be rotated. In consequence, a higher accuracy of image correction is achieved.

12 Claims, 3 Drawing Sheets

U.S. PATENT DOCUMENTS

| | | | |
|---|---|---|---|
| 5,940,544 A * | 8/1999 | Nako | 382/293 |
| 6,064,778 A * | 5/2000 | Pasco et al. | 382/289 |
| 6,082,619 A * | 7/2000 | Ma et al. | 235/462.1 |
| 6,301,397 B1 * | 10/2001 | Jankowski et al. | 382/296 |
| 6,307,963 B1 * | 10/2001 | Nishida et al. | 382/190 |
| 6,310,984 B2 * | 10/2001 | Sansom-Wai et al. | 382/289 |
| 6,360,026 B1 * | 3/2002 | Kulkarni et al. | 382/289 |
| 6,373,590 B1 * | 4/2002 | Ancin et al. | 358/1.18 |
| 6,430,320 B1 * | 8/2002 | Jia et al. | 382/289 |
| 6,433,896 B1 * | 8/2002 | Ueda et al. | 358/488 |
| 6,466,693 B1 * | 10/2002 | Otsu et al. | 382/176 |
| 6,674,919 B1 * | 1/2004 | Ma et al. | 382/289 |
| 6,807,286 B1 * | 10/2004 | Krumm et al. | 382/103 |
| 6,898,333 B1 * | 5/2005 | Gopalakrishnan et al. | 382/289 |
| 6,941,016 B1 * | 9/2005 | Wagman et al. | 382/199 |
| 7,181,066 B1 * | 2/2007 | Wagman et al. | 382/183 |

* cited by examiner

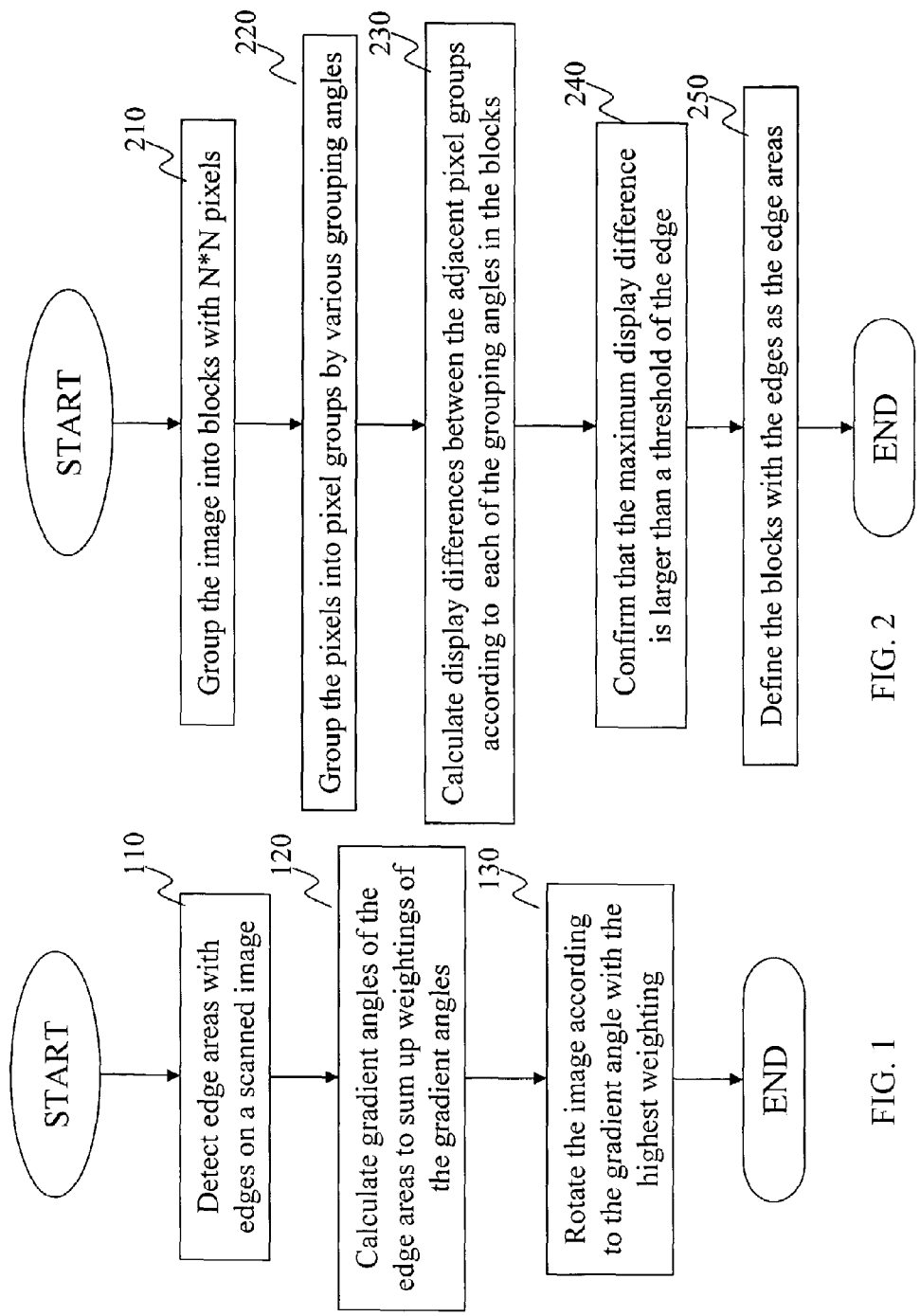

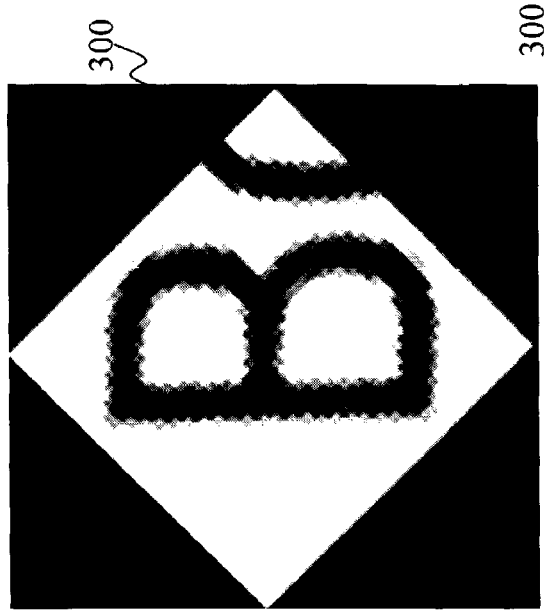
FIG. 8
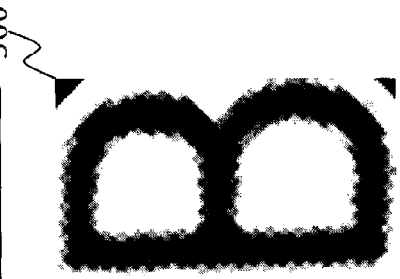
FIG. 9
| 83 | 60 | 53 |
|---|---|---|
| 137 | 73 | 51 |
| 200 | 141 | 86 |
FIG. 7
FIG. 6
| -1 | 0 | 1 |
|---|---|---|
| -2 | 0 | 2 |
| -1 | 0 | 1 |
Gx
| -1 | -2 | -1 |
|---|---|---|
| 0 | 0 | 0 |
| 1 | 2 | 1 |
Gy
FIG. 5

METHOD FOR AUTOMATICALLY CORRECTING SKEW IMAGE

BACKGROUND OF THE INVENTION

1. Field of Invention

The invention relates to a method for correcting skew images, which in particular to an image de-skew technology, acquires the precise skew angle of a scanned image.

2. Related Art

It is familiar to obtain skew images while using a copier to make a copy, or using a scanner to capture images from plane media, such as paper sheets. In general, it is attributed to a medium placed at a skew angle but not at an exact position.

To solve this problem, the key point is how to acquire the precise skew angle. Generally, the characteristics of a scanned image depend on the fundamental elements in a document, such as characters, pictures and tables. Elements available in a document are usually arranged in transverse or lengthwise directions. Most of prior arts obtain the skew angles in accordance with the variations of elements arrangement in transverse or lengthwise directions. However, such methods fail to attain the accurate skew angle due to completely detecting through the whole medium, or every pixel in a predetermined area thereon. Too many variations cause serious interferences while considering all the pixels. Consequently, the calculating result is still an incorrect skew angle, from which another skew image is derived.

SUMMARY OF THE INVENTION

In view of the foregoing, the invention wants to solve the problems of the incorrect skew angle: the transverse or lengthwise variations of the fundamental elements on a plane medium are not achieved to an accurate skew angle for rotating the skew image to the normal position.

The above problems have been solved by providing a method for correcting skew images, which includes steps as follows: (a) detecting edge areas with edges on a scanned image; (b) calculating gradient angles of the edge areas to sum up weightings of the gradient angles; and (c) rotating the image according to the gradient angle with the highest weighting.

The determination of the edge areas further comprises the following steps.

(i) Group the image into blocks with N*N pixels.
(ii) Group the pixels into pixel groups by various grouping angles.
(iii) Calculate display differences between the adjacent pixel groups according to each of the grouping angles in the blocks.
(iv) Confirm that the maximum display difference is larger than a threshold of the edge.
(v) Define the blocks having the edges as the edge areas.

In short, the invention achieves a skew angle with high accuracy, by first detecting all the pixels on an image through the blocks with N*N pixels, and by finding out the edge areas with the edges. Next, calculate the gradient angles of all the edge areas to add up the weightings, to attain the precise skew angle according to the gradient angle with the highest weighting.

BRIEF DESCRIPTION OF THE DRAWINGS

The invention will become more fully understood from the detailed description given herein below illustration only, and is thus not limitative of the present invention, and wherein:

FIG. 1 is a main flowchart of the method according to the invention;

FIG. 2 is another flowchart of the method, showing the procedure to determine the edge areas;

FIG. 3 is a diagram of a block with 3*3 pixels;

FIG. 4a is also a diagram of a block with 3*3 pixels, showing the pixel groups grouped by highlights in grouping angle 0°;

FIG. 4b is another a diagram of a block with 3*3 pixels, showing the pixel groups grouped by highlights in grouping angle 45°;

FIG. 4c is a diagram of a block with 3*3 pixels, showing the pixel groups grouped by highlights in grouping angle 90°;

FIG. 4d is a diagram of a block with 3*3 pixels, showing the pixel groups grouped by highlights in grouping angle 135°;

FIG. 5 is an explanation diagram of the Sobel Operators Gx and Gy used in the invention;

FIG. 6 is a view of a skew image in a preferred embodiment according to the invention;

FIG. 7 shows display parameters in block 311 according to FIG. 6;

FIG. 8 shows an image after rotating the original skew image of FIG. 6 in the derived skew angle; and FIG. 9 shows another image after cutting off the surplus boundaries of the rotated image in FIG. 8.

DETAILED DESCRIPTION OF THE INVENTION

The correcting method for skew images provided by the invention is for adjusting skew scanned images, which have fundamental elements such as characters, pictures and tables, arranged originally in transverse or lengthwise directions on the plane media. In other words, images are suitable for using the disclosed invention if they have fundamental elements with the uniformity of a transverse or lengthwise arrangement.

With reference to FIGS. 1 and 2, the method according to the invention mainly comprises the following steps.

First, detect edge areas with edges on a scanned image (Step 110). Next, calculate gradient angles of the edge areas to sum up weightings of the gradient angles (Step 120). Eventually, rotate the image according to the gradient angle with the highest weighting (Step 130).

The above steps are then further illustrated in details as follows.

(1) Step 110: Detect Edge Areas with Edges on a Scanned Image

The edge shows that the maximum display difference is larger than a predetermined threshold, wherein the display difference means a display parameter such as a luminance difference or a chrominance difference. The threshold is preselected from experience data in accordance with the types of image capturing devices, e.g. a copier or a scanner. As shown in FIG. 2, the edge areas obtained in Step 110 are determined by the steps of:

A. Group the image into blocks with N*N pixels (Step 210), wherein N is an odd number except 1. Taking N=3 as an example, there are 9 pixels included in a block, which numbered as 1-9. Z1 to Z9 represent the display parameters of all the 9 pixels respectively. As mentioned above, the display parameters are optionally defined as the luminance difference or a chrominance difference.

Figures 3, 4A, 4B, 4C, 4D:
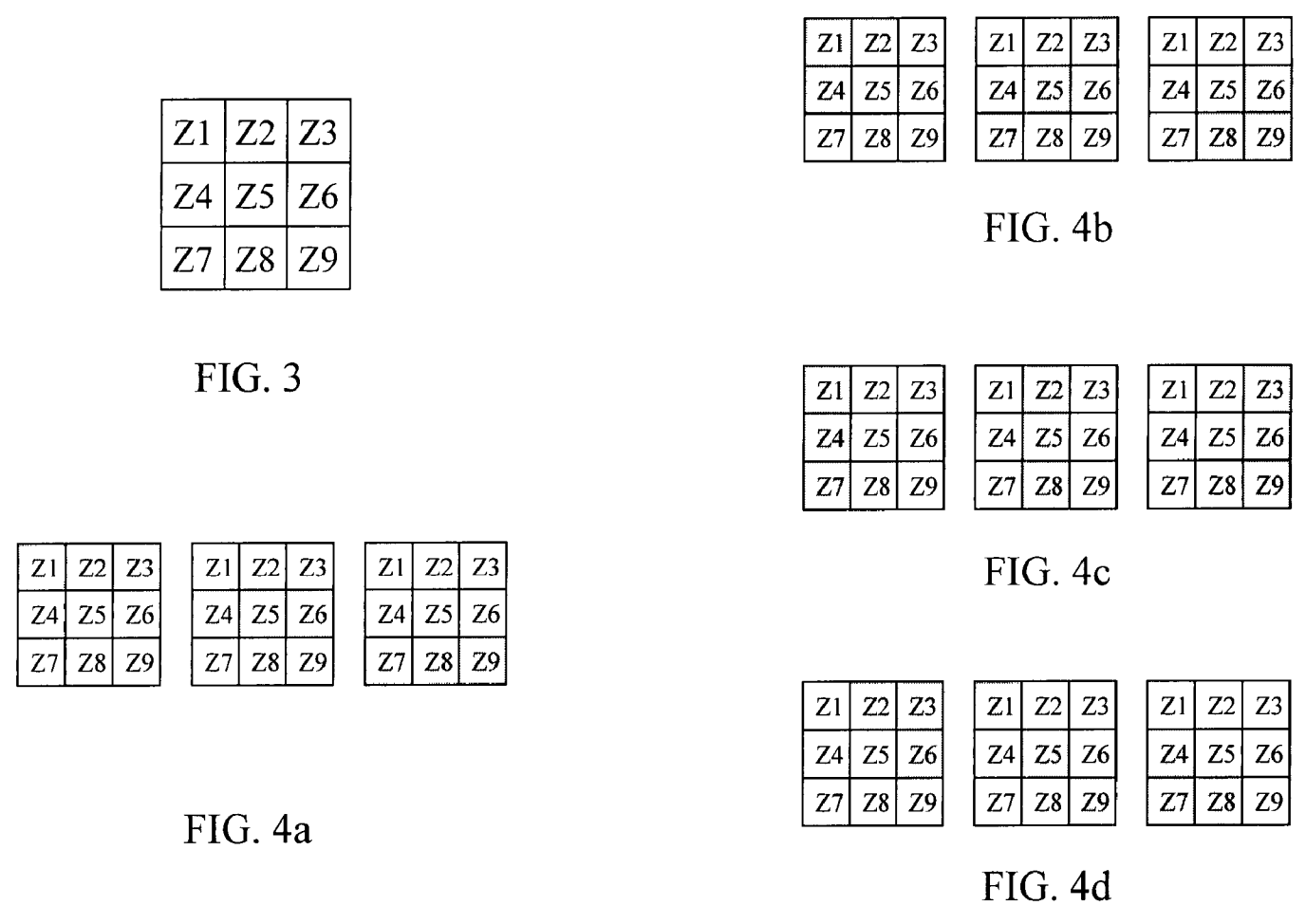

B. Group the pixels into pixel groups by various grouping angles (Step 220). The alternatively selected grouping angles are the angles of 0°, 45°, 90° and 135° to the horizontal coordinate axis. In each of the 4 angles, various pixel groups are grouped. In angle of 0°, the pixel groups are grouped into group 123, group 456 and group 789 (shown in FIG. 4*a*). In angle of 45°, the pixel groups are grouped into group 124, group 357 and group 689 (shown in FIG. 4*b*). In angle of 90°, the pixel groups are grouped into group 147, group 258 and group 369 (shown in FIG. 4*c*). In angle of 135°, the pixel groups are grouped into group 236, group 159 and group 478 (shown in FIG. 4*d*).

C. Calculate display differences between the adjacent pixel groups according to each of the grouping angles in the blocks (Step 230). The term DATA down below represent the display parameter sum, which means the sum of the display parameters of all the pixels included in a pixel group.

0°:

Data123=Z1+Z2+Z3

Data456=Z4+Z5+Z6

Data789=Z7+Z8+Z9

45°:

Data124=Z1+Z2+Z4

Data357=Z3+Z5+Z7

Data689=Z6+Z8+Z9

90°:

Data147=Z1+Z4+Z7

Data258=Z2+Z5+Z8

Data369=Z3+Z6+Z9

135°:

Data236=Z2+Z3+Z6

Data159=Z1+Z5+Z9

Data478=Z4+Z7+Z8

Take Diff as the display difference, the term Diff is defined as the difference of the display parameter sums between any two of the adjacent pixel groups (Abs means absolute value), where a. 0°:

Diff123_456=Abs(Data123−Data456)

Diff789_456=Abs(Data789−Data456)

b. 45°:

Diff124_357=Abs(Data124−Data357)

Diff689_357=Abs(Data689−Data357)

c. 90°:

Diff147_258=Abs(Data147−Data258)

Diff369_258=Abs(Data369−Data258)

d. 135°:

Diff478_159=Abs(Data478−Data159)

Diff478_159=Abs(Data478−Data159)

D. Confirm that the maximum display difference is larger than a threshold of the edge (Step 240). According to the definition in the foregoing, that means that there exists an edge in the block. In general, if the display difference is larger, the displaying performance will be much more obvious. If the difference is larger than a threshold (e.g. 120 of the luminance), or equals to the threshold, the block is classified for the sampling.

E. Define the blocks having the edges as the edge areas (Step 250). The blocks defined as edge areas will be further processed.

(2) Step 120: Calculate Gradient Angles of the Edge Areas to Sum Up Weightings of the Gradient Angles The display difference of each of the edge areas is transformed into a gradient angle, which represents one of the possible skew angles of the image.

The calculation of the gradient angle is achieved through Sobel operators, Gx and Gy, as shown in FIG. 5. With reference to FIG. 3, the calculating expression of the gradient angle A of the edge area is expressed as follows.

$Gx=(Z7+2*Z8+Z9)-(Z1+2*Z2+Z3)$ $Gy=(Z3+2*Z6+Z9)-(Z1+2*Z4+Z7)$ $A=\tan^{-1}(Gy/Gx)$ wherein A is the angle to the horizontal coordinate axis, and "$\tan^{-1}$" is the inverse function of the trigonometric function, "tan".

The gradient angle with the highest weighting is derived via adding up the weightings of all the calculated gradient angles. Based on the uniformity of arrangement of the fundamental elements, the gradient angle with the highest weighting, i.e. the predominant angle, is exactly the skew angle of the image.

(3) Step 130: Rotate the Image According to the Gradient Angle with the Highest Weighting Technologies for rotating an image to a specific angle are common in the prior arts. The feature of the invention is precisely seeking the skew angle by adding up the weightings of the gradient angles.

A preferred embodiment is provided for detailed explanation. As shown in FIG. 6, it is easy to recognize one of the fundamental elements on image 300 is character B. The image of character B 310 is skewed at an angle. After processing Step 210 and 220 that attain blocks and pixel groups respectively, Step 230 is processed to calculate the display differences. In this preferred embodiment, the display difference is based on the luminance value. Taking block 311 as an example, the luminance value (the display parameter) of each pixel is shown in FIG. 7. Moreover, the display parameter sum of each pixel is calculated as follows:

0°:

Data123=83+60+53 =196

Data456=137+73+51=261

Data789=200+141+86=427

45°:

Data124=83+60+137=280

Data689=51+141+86=278

Data357=53+73+200=326

90°:

Data147=83+137+200=420

Data258=60+73+141=274

Data369=53+51+86=190

135°:

$$Data478 = 137 + 200 + 141 = 478$$

$$Data159 = 83 + 73 + 86 = 242$$

$$Data236 = 60 + 53 + 51 = 164$$

The Calculation of the display differences are:

0°:

$$Diff123\_456 = abs(Data123 - Data456) = abs(196 - 261) = 65$$

$$Diff789\_456 = abs(Data789 - Data456) = abs(427 - 2610) = 166$$

45°:

$$Diff124\_357 = abs(Data124 - Data357) = abs(280 - 326) = 46$$

$$Diff689\_357 = abs(Data689 - Data357) = abs(278 - 326) = 48$$

90°:

$$Diff147\_258 = abs(Data147 - Data258) = abs(420 - 274) = 146$$

$$Diff369\_258 = abs(Data369 - Data258) = abs(190 - 274) = 84$$

135°:

$$Diff478\_159 = abs(Data478 - Data159) = abs(478 - 242) = 236$$

$$Diff236\_159 = abs(Data236 - Data159) = abs(164 - 242) = 78$$

The result shows that the maximum display difference is 236. If the predetermined threshold is 120 and 236>120, block 311 can be defined as an edge area with an edge. Next, the gradient angle can be calculated in the following:

$$Gx = (Z7 + 2*Z8 + Z9) - (Z1 + 2*Z2 + Z3)$$
$$= (200 + 2*141 + 86) - (83 + 2*60 + 53)$$
$$= 312$$
$$Gy = (Z3 + 2*Z6 + Z9) - (Z1 + 2*Z4 + Z7)$$
$$= (53 + 2*51 + 86) - (86 + 2*137 + 200)$$
$$= -316$$
$$A = \tan^{-1}(Gy/Gx) = \tan^{-1}(-316/312) = -1$$
$$\text{Gradient angle } A = -1*(180/\pi) = -45°$$

Repeat the procedures in the foregoing to find out all the edge areas, and calculate the gradient angles to sum up the weightings. Thus, finding an angle of −45° has the highest weighting. Hence, we can take −45° as the skew angle, to which the image can be rotated, as shown in FIG. 8.

The skew angles obtained via the invention are usually in the range of about −89° and about 89°. However, a skew angle attaining near −89° or 89° maybe means that the image is purposely placed in an angle of 90°. Therefore, it is necessary to confirm that the gradient angles are located in a predetermined range after having them calculated. The range between about −89° to 89° is used in theory but optimal range of −45° to 45° is more practical.

Generally, surplus boundaries of the rotated image 300 (show in FIG. 8) needs to be cut off. Thus, we provide a further step to adjust the boundaries of the rotated image. A final image 300 shows in FIG. 9.

When applying the invention on scanning devices or copiers, an extra step of outputting a caution message may be helpful. Such step alerts the user to operate again for preventing the output image from being cut incompletely during steps of adjusting the image boundaries, and for keeping the completeness of the image.

Certain variations would be apparent to those skilled in the art, which variations are considered within the spirit and scope of the claimed invention.

What is claimed is:

1. A method for correcting skew images in an image capturing device comprising the steps of:
   (a) detecting a plurality of edge areas on an image in the image capturing device, each of the edge areas having an edge, wherein the edge areas are determined by the steps of:
      (i) grouping the image into a plurality of blocks, each of the blocks having N*N pixels, wherein N is an odd number other than 1;
      (ii) grouping the pixels into a plurality of pixel groups according to a plurality of grouping angles;
      (iii) calculating the display differences between the adjacent pixel groups according to each of the grouping angles;
      (iv) confirming that the maximum display difference is larger than the threshold; and
      (v) defining the blocks with the edges as the edge areas;
   (b) calculating a plurality of gradient angles of the edge areas, and determining a predominant angle from among the calculated gradient angles; and
   (c) rotating the image according to the predominant gradient angle;
   wherein the edge represents that the maximum display difference in each of the edge areas is larger than a threshold.

2. The method of claim 1, wherein the blocks are grouped into the pixel groups by the grouping angles of 0°, 45°, 90° or 135° to a horizontal coordinate axis.

3. The method of claim 1, wherein the display difference is the difference of display parameter sums between any two of the adjacent pixel groups.

4. The method of claim 3, wherein the display parameter sum is the sum of the display parameters of the pixels included in each of the pixel groups.

5. The method of claim 4, wherein the display parameter is a luminance value or a chrominance value of each of the pixels.

6. The method of claim 1, wherein the display difference is a luminance difference or a chrominance difference.

7. The method of claim 1, further comprising a confirming step performed after step (b), the confirming step confirming that the plurality of gradient angles are in a predetermined range.

8. The method of claim 7, wherein the range is between −89° to 89°.

9. The method of claim 8, wherein the optimal range is between −45° to 45°.

10. The method of claim 1, further comprising a step of outputting a caution message.

11. The method of claim 1, further comprising a step of adjusting the boundaries of the image after rotated.

12. The method of claim 1, wherein the gradient angles are calculated by using Sobel operators.

* * * * *